Sept. 30, 1952 H. S. HELLER 2,612,565

SAFETY DEVICE FOR PREVENTING ACCIDENTAL ERASING OR DOUBLE RECORDING ON MAGNETIC RECORD TAPE

Filed May 24, 1948 2 SHEETS—SHEET 1

HERMAN S. HELLER,
INVENTOR.

BY Forest J. Lilly
ATTORNEY

HERMAN S. HELLER,
INVENTOR.

BY [signature]

ATTORNEY

Patented Sept. 30, 1952

2,612,565

UNITED STATES PATENT OFFICE 2,612,565

SAFETY DEVICE FOR PREVENTING ACCIDENTAL ERASING OR DOUBLE RECORDING ON MAGNETIC RECORD TAPE

Herman S. Heller, West Los Angeles, Calif.

Application May 24, 1948, Serial No. 28,834

3 Claims. (Cl. 179—100.2)

This invention relates generally to magnetic sound recording and reproducing machines, and while the invention is not limited thereto, my preferred and illustrative form of such a machine employs a separable record magazine carrying a record of the tape type.

It is well known that magnetic sound records are capable of being very readily "erased" from the record medium. This may be accomplished by either demagnetizing the record, magnetizing it to saturation, or subjecting it to the influence of a high frequency magnetic field. Magnetic sound recording and reproducing machines are in fact furnished with "erasing" eletromagnets by which this function can be carried out whenever it is desired to clean or correct a record. Sometimes, however, through inadvertence in the operation of the machine, the erasing magnets are mistakenly energized, and a valuable or important recording thereby obliterated. Again, it may happen that the recording circuit is mistakenly energized, causing a second recording to be superimposed over the original, thus ruining the latter.

It is accordingly a primary object of the present invention to provide a safeguarding means preventing inadvertent erasing or superimposed double recording for certain conditions of operation of the machine.

While the invention may be carried into effect in various ways, it is conveniently and illustratively applied to a type of machine having record tape magazines which are separable from the machine and thus readily interchangeable. According to this preferred application of the invention, a de-commissioning switch means is employed in the electric circuit of the erasing and translating electromagnets, and is arranged to be actuated by the operation of mounting a record magazine on the machine. With this switch actuated, the erasing and recording functions of the magnets are killed, and there is no possiblity therefore of obliterating a recording previously made on the record tape. There is also provided, however, a means whereby the de-commissioning switch means can be released, so that the record on the tape in the magazine can be erased and a new recording made according to the usual practice.

The invention also provides certain related improvements in magnetic sound recording machines, as will appear in the course of the following detailed description of my present preferred embodiment thereof. Reference is had to the accompanying drawings, in which.

Figures 1, 2, 3, 4, 5, 5A:
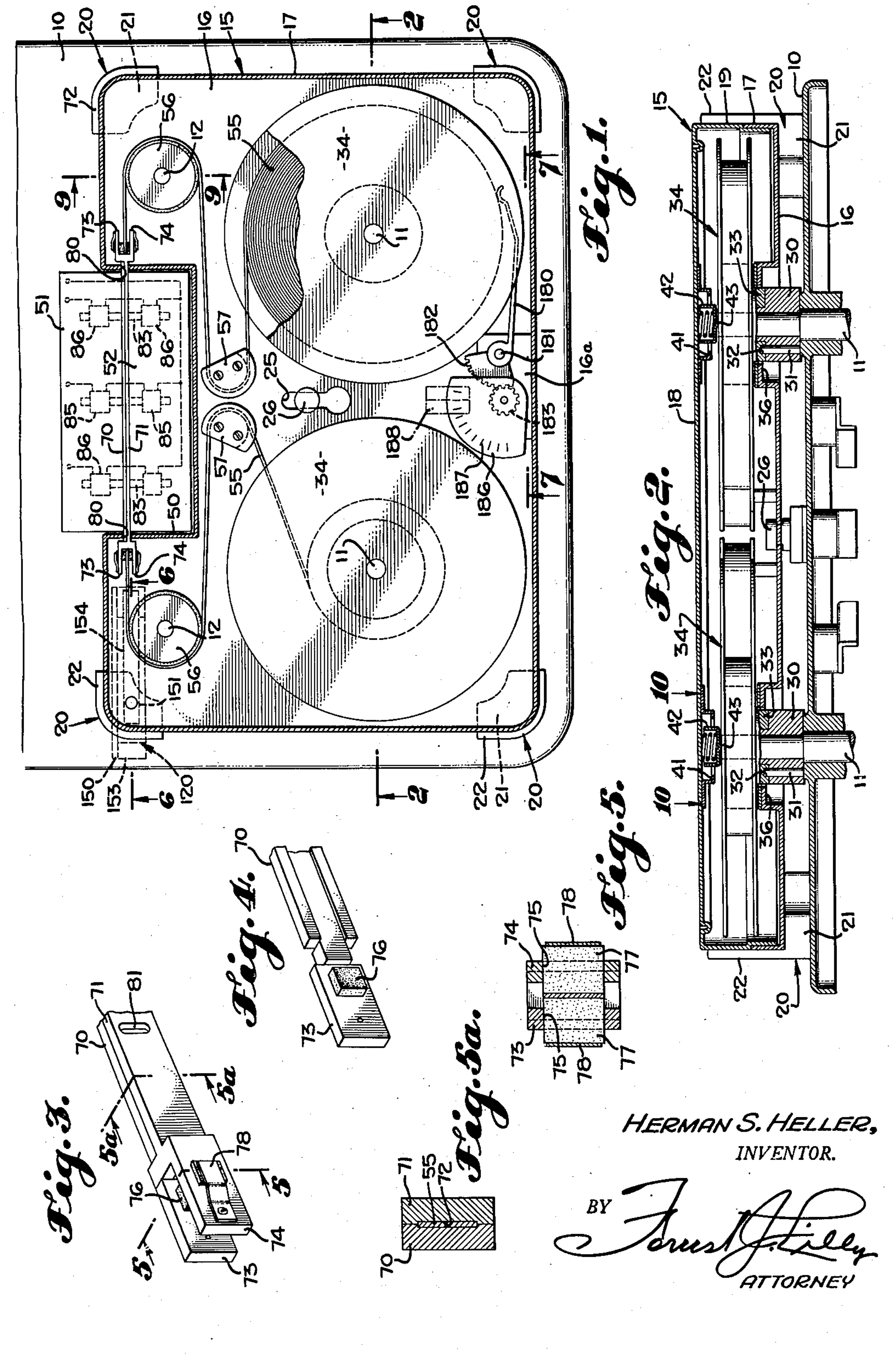
Figure 1 is a plan view, with parts broken away, of the top of a sound recording and reproducing machine having applied thereto a tape magazine, the upper half of the latter being removed.
Figure 2 is a section on line 2—2 of Figure 1.
Figure 3 is a detail perspective of one end portion of a tape guide.
Figure 4 is a view similar to Figure 3 but showing one part of the tape guide assembly only.
Figure 5 is a transverse section on line 5—5 of Figure 3.
Figures 6, 7, 8, 9, 10, 11, 12, 12A, 13:
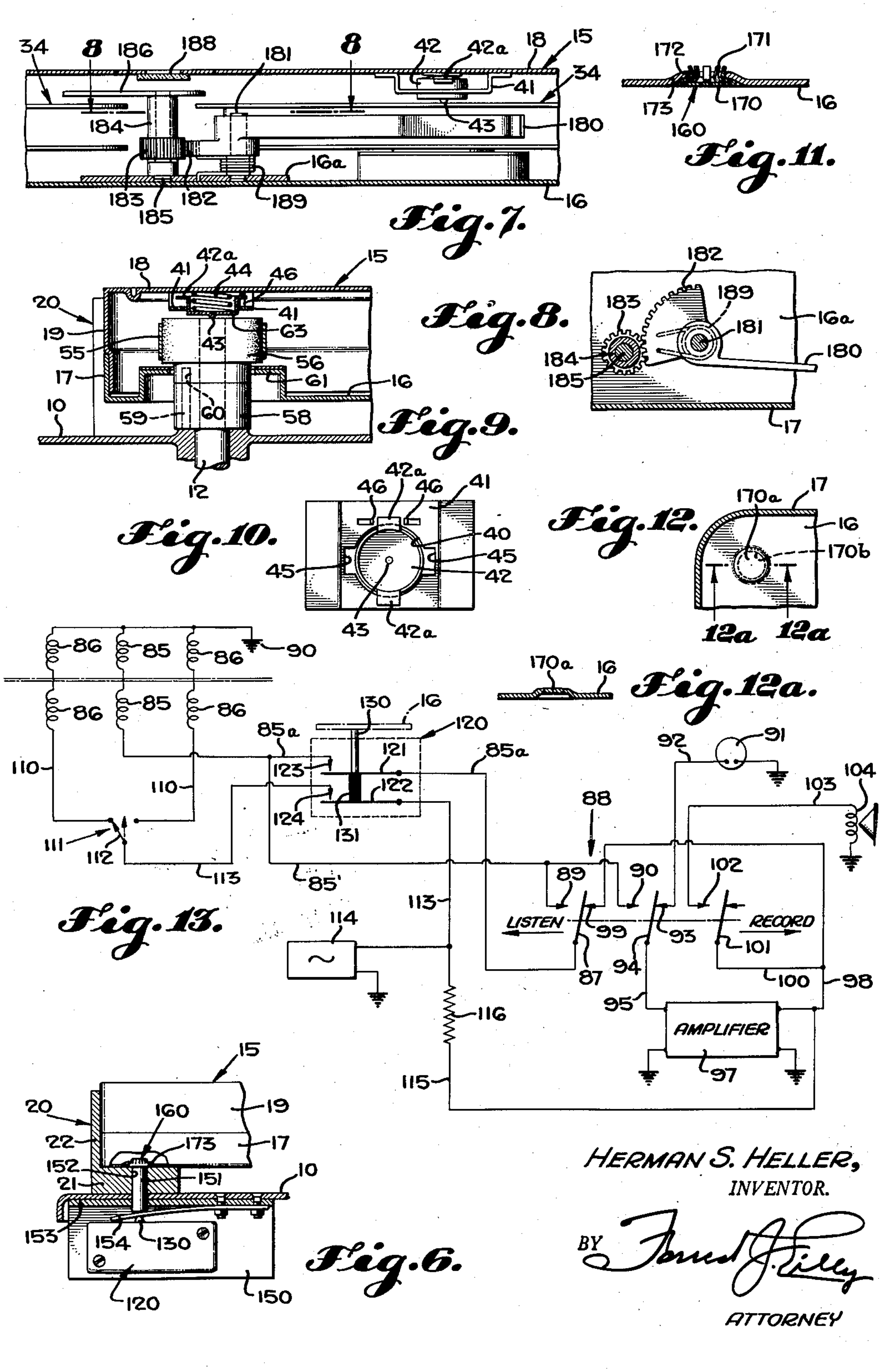

Figure 5*a* is a section on line 5*a*—5*a* of Figure 3;

Figure 6 is a section on line 6—6 of Figure 1;

Figure 7 is a section on line 7—7 of Figure 1;

Figure 8 is a section on line 8—8 of Figure 7;

Figure 9 is a section on line 9—9 of Figure 1;

Figure 10 is a section on line 10—10 of Figure 2;

Figure 11 is an enlarged detail of a portion of Figure 6;

Figure 12 is a fragmentary view of a corner portion of the lower wall of a magazine showing a modification;

Figure 12*a* is a detail section on line 12*a*—12*a* of Figure 12; and

Figure 13 is a diagrammatic view showing a preferred embodiment of the electrical circuit of the invention.

The invention is shown in an exemplary form applied to a known type of sound recording and reproducing machine having a main frame understood to mount the main drive motor, drive shafts for two tape reels and two tape driving rollers, and the usual translating and erasing magnets, together with a removable tape magazine. For an earlier disclosure of such a machine, see my application Serial No. 608,734 filed August 3, 1945 entitled Tape Drive Sound Recording and Reproducing Machine; also see Patent Number 2,364,556 to Somers.

Referring now to Figures 1 and 2 of the drawings, numeral 10 designates generally the top plate of the main frame of such a sound recording and reproducing machine, said plate providing bearings for two reel shafts 11 and two drive roller shafts 12 (see also Figure 9), all of which shafts project upwardly a short distance above the surface of the said main frame top plate 10. The two shafts 11 will be understood to be driven, as usual, through conventional over-running or one-way clutches incorporating frictional slip devices as discussed in my aforesaid application Serial No. 608,734, devices of this character being described in more detail in United States Patent Number 2,209,582 to Ross. This part of the machine forms no part of the present invention, and reference to said prior application and patent will suffice for present purposes. It may however be explained that each one-way clutch drives its reel shafts in one direction only, for the purpose of winding up the tape, one clutch driving and the other running freely for each direction of the tape. The frictional slip feature is a common expedient employed to permit slippage in the drive when or if the roll of tape on the driven take-up reel becomes so great in circumference that the reel tends to wind up the tape at a faster rate than the tape arrives from the positively driven drive rolls. The latter, presently to be mentioned in more particular, are driven from the shafts 12, as already mentioned.

The magazine 15 includes a base or bottom half consisting of bottom plate 16 having upturned marginal flange 17, and also a cover or top half consisting of a top plate 18 having downturned marginal flange 19 adapted to fit inside bottom half flange 17, as clearly shown in Figure 2. This magazine is received and supported by four corner supports 20, each consisting of a spacer 21 mounted on and fastened to top plate 10, and a curved positioning flange 22 formed to receive and position the arcuate corner portion of the magazine. The magazine will be seen to be received snugly inside the four positioning flanges 22, and to rest down on the spacers 21, leaving a predetermined spacing distance between the bottom 16 of the magazine and the top plate 10 of the main frame. The bottom wall 16 of the magazine has a key hole slot 25 adapted to receive a bolt 26, which is movably mounted on the main frame plate 10 and operable ot lock the magazine securely to the latter. For a more complete disclosure of this feature, see copending application Serial No. 720,217, filed January 4, 1947 entitled Removable Magazine for Tape, filed by Herman S. Heller and Donald E. Ross.

Tightly mounted on each reel shaft 11, immediately above plate 10, is a clutch collar 30 having vertically projecting drive pin 31 receivable in socket 32 in reel hub 33. As indicated in Figure 2, shaft 11 projects upwardly through the hub of the tape reel, designated generally by numeral 34, and it will be understood that the reel is freely separable from the shaft 11 to permit separation of the magazine from the machine. For details of a preferred construction to this end, see the aforementioned application Serial No. 720,217.

The bottom plate 16 of the reel is formed around clutch 30 with an inward off-set 36 adapted to receive the hub 33 of the reel and limit its downward travel when the magazine is separated from the plate 10, and hence from the clutch 30. Mounted for vertical movement in a circular aperture 40 in a bracket 41 secured to the underside of the magazine cover is a thin metal cup 42 having a lower central projection 43 which is engageable with the center of the upper end of the reel shaft when the magazine is on the plate 10, and a coil spring 44 positioned inside said cup and engageable against the upper magazine wall urges said cup downwardly at all times. It will be evident that when the magazine is separated from the machine, this spring-pressed cup will engage the reel and will hold it against the off-set 36 while the magazine reels are separated from the machine. The reel is thus prevented from moving about and becoming displaced within the magazine. To retain the cup in position or in assembly with reference to bracket 41 when no reel is present in the magazine, or when the magazine cover is removed, the cup is provided with diametrically opposed ears 42*a* which extend outside the aperture 40. The cup may be assembled or disassembled by turning it to a position at 90° from that shown in Figure 10, whereupon the ears 42*a* will pass through the apertures 45. To prevent accidental dislodgment of the cup from the bracket, a pair of upwardly struck lugs 46 normally confine one of the ears 42*a* against movement toward a position of registration with the apertures 45. Sufficient depression of the cup against the spring 44 will however cause the ears 44*a* to clear the lugs 46, so that the cup can be readily assembled or disassembled.

The magazine will be seen to have a re-entrant notch 50 in its rearward edge, and this notch is adapted to receive the two spaced blocks 51 and 52 carrying the erasing and translating electromagnets, the members 51 and 52 being understood to be mounted on the aforementioned top frame plate 10. The two reels 34 will be seen to be positioned near the forward edge of the magazine, and wound on the hubs 33 thereof is the magnetic tape 55. The tape drive rollers 56 mounted on the aforementioned shafts 12 are disposed near the rearward edge of the magazine, on opposite sides of the notch 50, in such positions that the tape passing tangentially between their rearward sides will extend across the notch 50 through the narrow space between the two magnet blocks 51 and 52. Between each roller 56 and the corresponding reel 34, the tape is looped around a frictional guide block 57, designed to provide a certain frictional restraint on the tape to prevent erratic travel of the latter. This block may be grooved and faced with a suitable frictional material, as more particularly described in the aforementioned application Serial No. 720,217.

Each tape drive roller 56 is removably mounted on the upper end portion of shaft 12, and is clutched thereto in a manner similar to the mounting of the reels on the reel shafts 11. Thus, each roller shaft 12 carries clutch collar 58 bearing drive pin 59 engageable in a socket 60 in the hub of roller 56. When the magazine is separated from the machine, roller 56 engages the inwardly off-set wall portion 61 of the magazine, and the roller is engaged from the top by spring-pressed cup 63 of the same type as described in connection with the reels.

The tape is positively guided across the notch 50, between the two magnet blocks 51 and 52, by a pair of guide members 70 and 71, between which is formed a closely fitting guide-way 72 for the tape 55. The two projecting end portions 73 and 74 of these members 70 and 71, respectively, are formed with apertures 75 in which are mounted felt pads 76 pressed against opposite surfaces of the tape by flat springs 78. These felt pads perform the desirable function of cleaning the surfaces of the tape. The members 70 and 71 are received and positioned by notches 80 formed in the flanges of the magazine at the two ends of the pre-entrant notch 50. The members 70 and 71 are formed with apertures such as indicated at 81 in Figure 3, to permit engagement of the pole pieces 83 of the translating electromagnets with opposite faces of the tape, as more particularly explained in the aforesaid application Serial No. 720,217. The details of the translating electromagnets mounted within the magnet blocks 51 and 52 need not be given, as they may be entirely conventional, or may be as particularly shown in an application of Herman S. Heller and Donald E. Ross, filed April 26, 1947, Serial No. 744,190 for Magnetic Translator Coil Assembly. For present purposes, the drawings indicate a pair of centrally positioned recording and reproducing electromagnets 85, and a pair of erasing electromagnets 86 positioned on each side of the magnets 85.

Referring now to Figure 13, each such pair of electromagnets will be seen to be electrically connected in series, and one end of each pair grounded, as indicated at 90. The ungrounded end of the translating magnets 85 is connected by lead 85a to the movable switch arm 87 of a Record-Listen switch generally designated by numeral 88. A branch lead 85' connects to switch contact 89, adapted to be contacted by switch arm 87 in the "listen" position, and also to a switch contact 90. Microphone 91 is connected by lead 92 to the switch contact 93 opposed to said contact 90, and a switch arm 94 associated therewith is connected by lead 95 to the input side of amplifier 97. The output side of amplifier 97 is connected by circuit lead 98 to switch contact 99, and a branch lead 100 from lead 98 connects to switch arm 101 which is adapted to make contact, in the "listen" position of the switch, with contact 102 connected by lead 103 to speaker 104.

The two pairs of erasing magnets 86 are connected by leads 110 to the two contacts of a double-throw switch 111, the movable switch arm 112 of which is connected by lead 113 to high frequency oscillator 114 from a source erasing current. A lead 115 containing a suitable voltage dropping resistor 116 connects oscillator 114 to amplifier output lead 98, for the purpose of supplying a high frequency biasing voltage to the recording electromagnets to aid in the recording function, as well known in the art.

A microswitch 120 having two spring switch arms 121 and 122 adapted normally to make contact with contacts 123 and 124, respectively, is placed in the circuit leads 86 and 113, respectively. For the normal operation of the recording and reproducing machine, these switch arms 121 and 122 are closed with their respective switch contacts. However, they may be opened and held open by the mounting of the magazine on the recording machine for the purpose of decommissioning the erasing and recording functions of the system. Thus, as diagrammatically represented in Figure 13, the lower wall 16 of the magazine has engaged insulation post 130 and spacer 131 to open the two switch arms 121 and 122, and thus open circuit the two leads 86 and 113.

The operation of the circuit of Figure 13 will first be described with the switch arms 121 and 122 of microswitch 120 assumed to be closed. Assuming the direction of the tape 55 to be from left to right in the figure, switch arm 112 would be closed with the contact placing the lefthand erasing coils 86 in circuit. It will be seen that the lefthand erasing coils receive erasing current from oscillator 114 via circuit lead 113, switch arm 112 and lead 110. Any recording previously on the record tape is thus erased as the tape passes the lefthand pair of erasing magnets, and is in clean condition as it reaches and passes the translating magnets 85. Assuming a recording is to be made, the various switch arms 87, 94 and 101 of switch 88 are thrown to the right, so that microphone 91 is connected through contact 93, switch arm 94, circuit lead 95, amplifier 97, lead 98, contact 99, switch arm 87 and lead 86 to the magnets 85, the switch arm 121 of microswitch 120 being recalled as closed under the assumed conditions of operation. At this same time, oscillator 114 supplies a high frequency bias to the recording magnets via circuit lead 115 to the amplifier output lead and thence to the recording magnets by the same circuit as just above traced.

For reproduction purposes, and assuming the tape to be driven in the same direction as before, the erasing magnet switch 112 is thrown to open position (central dotted line position), and switch 88 is thrown to the left. The circuit is then traced from magnets 85, then acting as reproducing magnets, via circuit lead 86a to switch contact 90, thence via switch arm 94 and lead 95 to the input side of amplifier 97, and from the output side of the latter via leads 98 and 100 to switch arm 101, and finally via contact 102 and lead 103 to speaker 104.

Assume now that the placement of the magazine on the machine has operated through the engagement of its bottom wall 16 with elements 130 and 131 to open the two switch arms of microswitch 120. Lead 113 is now broken, and it is therefore impossible to convey erasing current from oscillator 114 to erasing magnets 86. Also, it is impossible to make a recording on the tape under these conditions, since the lead 86, through which the voice current is normally transmitted to the magnets 85, is broken at switch arm 121 and contact 123. It will be clear, however, that there has been no interference with the record reproducing function of the system, since the circuit leads broken by the microswitch 120 play no part during reproduction.

Referring now to Figures 1 and 6, and illustrative positioning of the microswitch 120 and suitable actuating means therefor is shown. The microswitch 120 is shown as mounted on an angle bracket 150 secured to the underside of frame plate 10 directly beneath one of the magazine supports 20. A plunger 151 is mounted in a drill hole 152 extending downwardly through spacer 21, plate 10 and the wall portion 153 of angle bracket 150 that abuts and is secured to the plate 10. The bottom end of this plunger 151 engages and is normally supported by a leaf spring 154 secured to bracket 150, but which is adapted, in turn, when forced downwardly by pressure on said plunger, to engage and depress the movable actuating element 130 of microswitch 120. In a normal position of the apparatus, the spring 154 holds the plunger 151 in a position with its upper end somewhat raised above the spacer element 21, the spring 154 at such time being flat against the underside of wall 153, and the microswitch actuating element 130 being in its uppermost position. Thus, the leaf spring 154 rather than the microswitch is relied upon normally to carry the weight of the plunger 151. The lower wall of the magazine preferably is provided with a removable element 160, presently described in more particular, adapted to engage the upper end of the plunger 151 when the magazine is mounted on the machine, and to depress the plunger to the position of Figure 6, whereby to deflect spring 154 in a downward direction and actuate the microswitch 120 by downward engagement against microswith operating means 130. Thus, the action of mounting the magazine on the top plate 10 of the machine automatically opens the two circuits controlled by the microswitch 120. As already explained, this operation of the microswitch prevents operation of the erasing magnets, and also prevents the translating magnets 85 from making a recording on the tape.

It will thus be evident that if a magazine containing a tape bearing a magnetic recording is placed on the machine with the switch actuating element 160 in position, the erasing and recording functions of the equipment are rendered inoperative. Accordingly, it is impossible to either erase or make a second recording over the record borne by the tape. Thus any inadvertent improper operation of the machine is completely guarded against insofar as such operation might destroy the recording on the tape. Complete protection is afforded against the loss of a valuable recording. On the other hand, if it is desired to employ the erasing and/or recording features of the machine, the element 160 is removed from the magazine prior to mounting the magazine on the machine. In the preferred illustrative embodiment, this removable element 160 consists simply of a known type of fastener button 170 having curved prongs 171 which are inserted and engaged around the edge of an aperture 172 formed in the lower magazine wall. Preferably, the metal of the wall 16 around this aperture 172 is dimpled as at 173, so that the head of the button 170 is flush with the lower surface of the magazine. Such a button 170 is readily inserted or removed. It has a sufficiently tight engagement with the edges of the aperture 172, however, that it is not likely to become accidentally dislodged.

Removal of the button 170, of course, permits the plunger 151 to move upwardly a short distance, the upper end portion of the plunger being thrust through the aperture 172, and the spring 154 moving up against the underside of the bracket wall 153 to hold the plunger in its elevated position. The microswitch 120 is thus permitted to open, the two circuit leads 86 and 113 automatically close, and the machine is in condition to carry out its complete erasing and recording functions, as well as those of reproduction.

Figure 12 shows a modification, in which the removable button 170 of the embodiment just described is replaced by a deeply scored circular button area 170a of the bottom plate 16 of the magazine, this area being also preferably dimpled, as indicated. It is to be understood that the scoring line 170b defining this button 170a is deep enough that the disc area 170a can be easily knocked out by hitting it a light blow with a punch or other suitable tool. It is not, however, so weakly retained in position that it will not function to depress the microswitch control plunger 151 when left in place. Once this knock-out disc has been removed, the magazine can again be reconverted to actuate the switch 120 by inserting in the aperture left by the removed disc a button element 170 of the type used in the first described embodiment. For still other purposes, the magazine need not be provided with a removable plunger control element, but the unbroken wall 16 may be relied upon for this purpose. This latter situation would apply in any case in which the magazine was designed to contain a permanent recording, which was in no event to be erased or modified. In such case, it would be unnecessary and even undesirable to provide for removability of the area of the bottom wall 16 above the microswitch control plunger 151, and hence no provision therefor would be made. It will be unnecessary to further illustrate this final version of the invention, it being sufficiently indicated in the diagram of Figure 13.

The drawings also incidentally show a preferred means for indicating the amount of tape on one of the reels, to the end that the position of the tape within the magazine may always be known. For this purpose, an arm 180 having its free end bearing on the roll of tape on one of the reels is pivotally mounted on a stud 181 mounted in a plate 16a fastened to the bottom wall of the magazine, and the hub of this arm carries a gear sector 182 in mesh with a spur gear 183 on a sleeve 184 journalled on stud 185 mounted in said plate 16a. The upper end of sleeve 184 carries an indicator dial 186, inscribed with a suitable scale 187, which is visible through a small window 188 in the top wall of the magazine. The arm 180 is caused normally to bear on the roll of tape by means of a coil spring 189 surrounding stud 181 and connected between the magazine wall and the gear sector 182. It will be clear that the arm 180 will swing inwardly and outwardly in accordance with the amount of tape on the corresponding reel 34, and that this movement will be indicated by the position of dial 186 and its scale 187 with reference to the window 188 in the top of the magazine.

The invention has now been disclosed by way of a detailed description of certain present illustrative embodiments thereof. These are to be understood, of course, as merely illustrative rather than restrictive on the broad invention, since various changes in design, structure and arrangement may be made without departing from the scope and spirit of the invention.

I claim:

1. In a magnetic sound recording and reproducing machine having a quick detachable record magazine receivable in an operative position thereon, the combination of erasing and reproducing electromagnets adapted for coaction with a magnetic sound record carried by said magazine, electric circuits for said electromagnets, a decommissioning switch means on said machine for the circuit of said erasing electromagnets, and a readily displaceable switch actuating element on said magazine adapted when undisplaced to engage and actuate said switch means as the magazine is mounted in operative position on said machine, said displaceable element when displaced avoiding operative engagement with said switch means.

2. The combination as defined in claim 1, wherein said displaceable switch actuating element is detachably connected to said magazine.

3. In a magnetic sound recording and reproducing machine, erasing and reproducing electromagnets cooperable with a magnetic sound record, electric circuits for said electromagnets, and means actuated by mounting a magnetic sound record on said machine for decommissioning said erasing electromagnets, said means being readily displaceable to restore the function of said erasing electromagnets.

HERMAN S. HELLER.

REFERENCES CITED

The following references are of record in the file of this patent:

UNITED STATES PATENTS

| Number | Name | Date |
|---|---|---|
| 2,082,303 | Schiller | June 31, 1937 |
| 2,466,514 | Vogtborg | Apr. 5, 1949 |